UNITED STATES PATENT OFFICE.

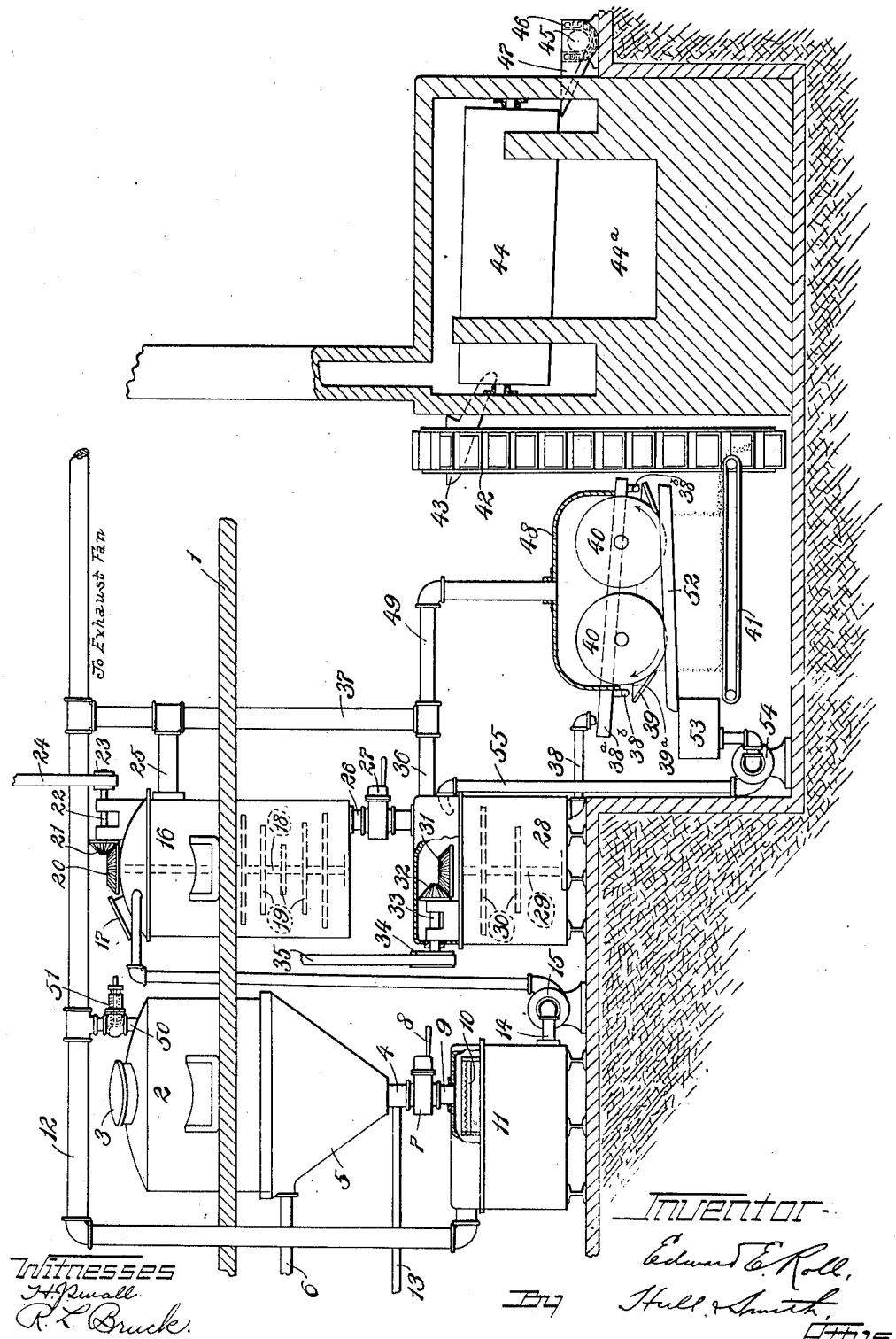

EDWARD E. ROLL, OF CLEVELAND, OHIO.

RETARDER.

1,308,644.  Specification of Letters Patent.  Patented July 1, 1919.

Application filed April 21, 1915. Serial No. 22,757.

*To all whom it may concern:*

Be it known that I, EDWARD E. ROLL, a citizen of the United States, residing at Cleveland, in the county of Cuyahoga and State of Ohio, have invented a certain new and useful Improvement in Retarders, of which the following is a full, clear, and exact description, reference being had to the accompanying drawings.

This invention relates to a process whereby what is known to the trade as "retarder" may be produced, the object of the invention being to provide a process whereby a stronger and more uniform product may be produced than is obtainable by ordinary methods; also to provide a process whereby the by-products may be recovered and saved, with the result that the expense of running the apparatus and of producing the retarder may largely, if not entirely, be paid for by such by-products. A still further object of the invention is to produce a process whereby the production of the product may be carried on continuously.

The retarder referred to hereinbefore consists generally of a ground mixture of thin water-slaked lime and a gluey mass that is obtained by dissolving cattle hair in a mixture of water-slaked lime and soda ash. By this treatment of the hair with the mixture of water-slaked lime and soda ash, the hair is dissolved, with production of the gluey mass referred to; more water-slaked lime is then added to and mixed with the gluey mass; the composition thus produced is dried and ground to a powder, and this powder is known to the trade as "retarder."

By my process it is possible to use practically any of the animal or vegetable by-products that are ordinarily used for the manufacture of glues, and the treatment of these by-products, leading up to the production of the retarder, is shown in the drawing forming part hereof wherein the figure shows, partly in elevation and partly in section, a somewhat diagrammatic view of the apparatus for carrying out my process.

In said drawing, 1 represents one of a pair of beams or sills which are adapted to support therebetween a digester and a mixing or compounding tank. 2 denotes the digester, the same being shown as a cylindrical vessel provided with a frusto-conical lower end and having a suitable filling opening provided with a man-hole cover 3. 4 denotes a large discharge outlet pipe leading from the bottom of the digester. The lower, frusto-conical end of the digester is provided with a steam jacket 5 to which steam under pressure may be supplied through a suitable pipe 6. 7 denotes the casing for an ordinary gate valve having an operating handle 8. From this gate valve there extends a pipe section 9 whereby the material discharged through the gate valve may pass onto a screen 10 in the upper end of a tank 11. From the upper end of this tank there extends a pipe 12, connected with a suitable exhaust fan and serving to conduct the ammonia, generated by the chemical reactions within the various parts of the apparatus, to a suitable collector (not shown). 13 denotes a pipe whereby steam may be introduced into the bottom of the digester, as through the outlet connection 4, thereby to agitate the batch in the digester and prevent the same from clogging, thus avoiding the necessity for a stirring rod.

From the bottom of the tank 11 a pipe 14 leads to a pump 15 whereby the gluey liquid collected in said tank is supplied to the top of the compounding or mixing tank 16. This tank is provided with a filling opening having a man-hole cover 17 and with an axial shaft 18 provided with stirring paddles 19, the shaft 18 being driven by means of the gears 20 and 21, the shaft 22, pulley 23 and belt 24. In the tank 16, the liquid is compounded or mixed with a suitable quantity of hydrated lime. This results in releasing ammonia, which may be led to the pipe 12 through a pipe 25. From the compounding tank 16, the watery mixture may be discharged through the outlet connection 26 and the gate valve 27 into a combined storage and mixing tank 28. This tank is provided with an axial shaft 29 having the paddles 30 thereon, the shaft being driven by the gears 31 and 32, shaft 33, pulley 34 and belt 35. In the compounding tank, a watery mixture is produced, and this watery mixture may be further agitated in the tank 28. The ammonia produced in the tank 28 will be led off through a pipe 36 into the vertical pipe 37 connected with the pipe 12. The pipe 25 may also connect with this vertical pipe.

The watery mixture is led from the bottom of the storage tank through a pipe 38 into troughs 39 extending alongside a pair of steam-heated drying rolls 40, the rolls revolving in the direction of the arrows, whereby the thin coating on each roll will be carried entirely around and dried in transit, the dried material being scraped off by the sharp bottom edges of the troughs. The material which is removed by the scraping action of the troughs drops upon an endless conveyer 41 which discharges onto a bucket elevator 42, which in turn discharges into a chute 43, the lower end whereof deposits the material within an inclined drying cylinder 44. From the discharge end of this cylinder the completely dried material is delivered into a cooler, which may be a water cooled conveyer of the worm-conveyer type. The one shown herein comprises a worm conveyer 45 within a U-shaped trough 46, which trough may be double walled, whereby water may be circulated through the trough thereby to cool the powdered retarder carried therealong by the action of the worm. The powdered material from the cylinder 44 is conducted to one end of the trough and worm by means of a chute 47. The cooling of the product is necessary because of the hygoscopic condition of the same. The use of hydrated lime in making the compound largely remedies the hygroscopic condition which has heretofore interfered with the uniformity in the character of the product.

The liquid supplied from the pipe 38 may be distributed to the troughs 39 by means of a transverse trough 38ª having tubes 38ᵇ arranged to discharge into the troughs 39. As more ammonia will be liberated during this drying step, a hood 48 is provided above the rolls, and from this hood there extends a pipe 49 which is shown as connected with the pipe 37 and thus, in turn, with the pipe 12.

With the apparatus constructed as described, the process will be conducted as follows:—In the digester 2 I place glue-producing matter, such as horns, hoofs, hair, etc., and a cheap alkali, such as soda ash, caustic soda, or caustic potash to assist in the disintegration and dissolution of these materials. The proportions which I have found satisfactory are 400 pounds of animal matter to 100 pounds of soda ash (or a corresponding quantity of caustic soda or caustic potash). To these ingredients, I add about 200 pounds of hydrated lime. The ingredients having been introduced into the digester, steam is turned on to the jacket under approximately 90 pounds pressure and should not materially exceed such pressure. The steam being retained within the jacket at the pressure mentioned, the ammonia released from the decomposition of the glue-producing matter will escape through the pipe 50 and the pressure-release valve 51 into the ammonia main 12. After the pressure within the digester reaches 70 to 90 pounds, the steam supply to the jacket 5 may be shut off and the materials retained therein for three or four hours. Where the pipe 13 is connected to the bottom of the digester above the gate valve, steam may be turned on to the bottom of the digester before dumping the contents thereof in order to prevent clogging and to avoid the necessity for a stirring rod. The contents having been deposited upon the screen 10, the waste products are retained by such screen and only the retarding liquid collects in the receiving tank. From this tank the liquid is pumped into the mixing or compounding tank 16 where it is mixed with about 1500 pounds of hydrated lime, the mixture produced being of a thin, watery consistency. The addition of this lime to the retarding liquid results in producing ammonia, that may be piped off to a condenser, as explained hereinbefore. From the mixing or compounding tank, the mixture is dumped into the storage tank 28, where it may be further agitated and mixed and any ammonia that may be present will be conducted away through the pipe 36. The liquid mixture is conducted from the storage tank by the pipe 38 to the troughs 39. One end of each of these troughs is closed, as indicated at 39ª, whereby any liquid in excess of that which can be taken up by the rolls 40 may flow the length of the trough along each roll and overflow into the transverse trough 52, thereby to be conducted through a tank 53, pump 54 and pipe 55 back into the storage tank 28. The material which is dried upon the outer surfaces of the rolls 40 is scraped therefrom by the lower edges of the troughs 39 and falls upon the endless conveyer 41 which in turn delivers it to the bucket conveyer 42. Thence the material is delivered into the drying cylinder 44, which may be heated in any approved manner (as by the furnace the fire box whereof is indicated at 44ª) and the thoroughly dried and hot retarder powder is then delivered to the worm conveyer where it is finally cooled, placing it in condition for grinding without the absorption of moisture, after which it may be ground in any approved type of grinding machine.

In describing that part of the process which is carried on in the tank 16, I have referred to the use of hydrated lime. I prefer to introduce lime in the hydrated condition into the tank 16 and to employ a dilute or watery solution of lime. However, it should be understood that I may introduce air slaked lime into the tank 16, mix this lime with the gluey liquid in said tank, and subsequently add to this mixture a sufficient quantity of water to produce a liquid of the desired consistency in said tank. The same is true as to the part of the process which is carried on in the digester; instead of adding hydrated lime directly to the digester, I may introduce slaked lime thereinto and at some subsequent stage add sufficient water to produce a liquid of the desired consistency. It will be understood that the term "hydrated lime" which appears in the claims annexed hereto is intended to include alike the original solution of lime or the solution or mixture that is produced subsequently by adding water to the digester or the mixing tank.

Having thus described my invention, what I claim is:

1. The process of producing a retarder which consists in heating glue-producing matter, alkali, and hydrated lime in about the proportions specified to produce therefrom a gluey liquid, mixing such liquid with hydrated lime in about the proportions specified, heating the mixture thereby to dry the same, cooling the mixture thus produced, and finally grinding the same.

2. The process of producing a retarder which consists in heating animal matter, alkali, and hydrated lime in about the proportions specified to produce therefrom a gluey liquid, mixing the resultant liquid with hydrated lime in about the proportions specified, evaporating the mixture, and finally grinding the resultant solid.

3. The process of producing a retarder which consists in heating a mixture of glue-producing matter, alkali, and hydrated lime in about the proportions specified under a pressure of from 70 to 90 pounds thereby to produce a gluey liquid, separating the liquid from the mass, mixing such liquid with hydrated lime in about the proportions specified to produce a watery liquid, evaporating such liquid by the application of heat thereto, and cooling and grinding the resultant solid matter.

4. The process of producing a retarder which consists in heating a mixture of animal matter, alkali, and hydrated lime in about the proportions specified under a pressure of from 70 to 90 pounds thereby to produce a gluey liquid, separating the liquid from the mass, mixing such liquid with hydrated lime in about the proportions specified to produce a watery liquid, evaporating such liquid, and cooling and grinding the resultant solid matter.

5. The process of producing a retarder which consists in subjecting a mixture of glue-producing matter, alkali, and hydrated lime in a digester to the heat of an externally applied heating agent until the pressure within the digester reaches approximately 70 to 90 pounds; then cutting off the supply of the heating agent and allowing the mass to stand for several hours; then withdrawing from the mass the liquid thus formed; mixing said liquid with hydrated lime in about the proportions specified to produce a liquid mixture of watery consistency; evaporating said liquid, and cooling and grinding the solid thus produced.

6. The process of producing a retarder which consists in subjecting a mixture of animal matter, alkali and hydrated lime in a digester to the heat of an externally applied heating agent until the pressure within the digester reaches approximately 70 to 90 pounds; then cutting off the heating agent and allowing the mass to stand for several hours; then withdrawing from the mass the liquid thus formed; mixing said liquid with hydrated lime in about the proportions specified to produce a liquid mixture of watery consistency; evaporating said liquid, and grinding the solid thus produced.

7. The process of producing a retarder which consists in heating matter capable of producing a gluey liquid, alkali, and lime in about the proportions specified to produce therefrom a gluey liquid, mixing such liquid with lime in about the proportions specified, and heating the mixture thus produced in order to dry the same and to recover the resultant solid retarder compound.

8. The process of producing a retarder which consists in heating matter capable of producing a gluey liquid in the presence of an alkali, slaked lime and water in the proportions to produce a gluey liquid therefrom, mixing such liquid with slaked lime and water in about the proportions specified, and heating the mixture thereby to expel the moisture and leave the gluey liquid in combination with the slaked lime.

In testimony whereof, I hereunto affix my signature in the presence of two witnesses.

EDWARD E. ROLL.

Witnesses:
J. B Hull,
Brennan B. West.